United States Patent
Delsart

(10) Patent No.: US 7,783,681 B1
(45) Date of Patent: Aug. 24, 2010

(54) METHOD AND SYSTEM FOR PRE-MARKING OBJECTS FOR CONCURRENT GARBAGE COLLECTION

(75) Inventor: Bertrand Delsart, Grenoble (FR)

(73) Assignee: Oracle America, Inc., Redwood City, CA (US)

( * ) Notice: Subject to any disclaimer, the term of this patent is extended or adjusted under 35 U.S.C. 154(b) by 313 days.

(21) Appl. No.: 11/639,751

(22) Filed: Dec. 15, 2006

(51) Int. Cl.
G06F 12/00 (2006.01)
G06F 17/30 (2006.01)
(52) U.S. Cl. ..................................... 707/813
(58) Field of Classification Search ............ None
See application file for complete search history.

(56) References Cited

U.S. PATENT DOCUMENTS

| | | | |
|---|---|---|---|
| 6,393,439 B1 * | 5/2002 | Houldsworth et al. | 707/206 |
| 6,571,260 B1 * | 5/2003 | Morris | 707/206 |
| 6,845,385 B1 * | 1/2005 | Hennessey | 707/206 |
| 7,404,182 B1 * | 7/2008 | Garthwaite et al. | 717/140 |
| 2002/0042807 A1 * | 4/2002 | Thomas et al. | 709/1 |
| 2005/0021576 A1 * | 1/2005 | Barabash et al. | 707/206 |
| 2005/0198088 A1 * | 9/2005 | Subramoney et al. | 707/206 |
| 2006/0155791 A1 * | 7/2006 | Tene et al. | 707/206 |
| 2007/0022149 A1 * | 1/2007 | Bacon et al. | 707/206 |
| 2008/0140737 A1 * | 6/2008 | Garst et al. | 707/206 |

OTHER PUBLICATIONS

Detlefs et al, "Garbage-First Garbage Collection", Proceedings of the 4th International Symposium on Memory Management, 2004, pp. 37-48.*
Printezis et al, "A Generational Mostly-concurrent Garbage Collector", ACM 2000, pp. 143-154.*

* cited by examiner

*Primary Examiner*—Uyen T. Le
(74) *Attorney, Agent, or Firm*—Martine Penilla & Gencarella, LLP

(57) ABSTRACT

A method and system for providing an efficient and concurrent garbage collection and mutator execution in a computer system includes identifying an object required by an application running on a mutator during a garbage collection cycle. The identified object is pre-marked by a garbage collector as a non-recyclable object during a pre-marking phase. One or more barriers to be executed by the mutator are then activated. The barriers enable the garbage collector to complete the garbage collection cycle by marking objects essential to the mutator so that unmarked objects may be recycled. The garbage collector is executed concurrently with the mutator so that the garbage collector can dynamically compute a set of recyclable objects in memory at the end of a garbage collection cycle.

11 Claims, 4 Drawing Sheets

METHOD AND SYSTEM FOR PRE-MARKING OBJECTS FOR CONCURRENT GARBAGE COLLECTION

BACKGROUND

1. Field of the Invention

The present invention relates generally to memory management within a computer system, and more particularly to concurrent garbage collection.

2. Description of the Related Art

Memory management plays a crucial role in the efficient utilization of memory in a computer system. Memory that is no longer needed is termed "garbage memory" and is reclaimed by a manual process or by an automatic memory management mechanism called "garbage collection". Memory management may be implemented as a manual process, where a developer or programmer has direct control over when and which part of memory can be recycled, or as an automatic process, where a service within the system, embedded as part of a language or as an extension, identifies and recovers expended memory. Automatic memory management frees a developer from mundane details such as coding for recovery of memory, allowing the developer to focus on developing application logic. The hardest part in memory management is to figure out when an object is no longer needed. Automatic garbage collection which has become an inherent part of memory management in most modern object-based systems resolves this issue by providing logic to identify objects no longer needed in memory.

A garbage collection running on a computer system interacts with a mutator on the system wherein an application program is executing. The mutator is capable of creating memory objects, writing values into these objects and reading values from these objects in response to the executing program. During the interaction with the mutator, the garbage collector (GC) identifies the objects that are being currently used by the mutator or needed at a later time during the execution of the application by the mutator. The GC uses various techniques, such as reference counting, for example, to dynamically compute, at regular intervals, a set of reachable objects. Reachable objects are those objects that are needed by the mutator during the execution of the application. From these reachable objects, the GC establishes a reachability graph using different algorithms, such as a mark-sweep algorithm, etc. Any object that is not identified as reachable is recycled. The fastest and easiest solution for identifying reachable and unreachable objects is by allowing the GC to stop all the mutators. The GC then finds a set of root objects. Root objects are objects that are directly referenced by the mutators or are in a location accessible by all mutators. The GC then looks through the root objects for objects that are referenced by the root objects to build a reachability graph. The drawback of stopping the mutators to build a reachability graph is that it takes up significant processing time and results in performance degradation of the system.

In order to overcome the performance degradation problem due to stopping of the mutators, concurrent garbage collection algorithm was introduced. The concurrent execution of the GC with the mutator resulted in a reachability graph that was not accurate as the set of reachable objects constantly evolved during the course of the mutator execution as described in the example illustrated in FIGS. 1A through 1E.

FIGS. 1A through 1E illustrate a high level overview of a reachability graph and marking operations associated with this reachability graph during a concurrent garbage collection cycle and a potential problem associated with this type of marking. A program executing on a mutator within a computer system references objects that are needed during the program's execution. These objects are allocated memory by a memory manager within the computer system so that the program can access these objects efficiently. A GC within the computer system regularly scans these objects and interacts with the mutator to identify objects that are in use. An object is in use if it can be accessed directly or reached by the mutator. The executing program can run in a plurality of threads with each thread actively executing a method. Each of these methods may reference one or more objects as variables. These referenced objects are part of what is called "root objects" as they are directly referenced and are immediately available to the program threads. Objects that are referenced by these root objects are "reachable" objects and objects referenced by these reachable objects are also reachable. These root and reachable objects are non-recyclable as they are being currently referenced or will be referenced by the executing program threads. Upon identifying objects that are in use, the GC can recycle the non-reachable objects as they are no longer needed by the mutator threads, and perform other operations to improve the performance of the mutator. The GC creates a "reachability" graph using the root objects and reachable objects. The objects within the reachability graph are marked such that they are not recycled. The GC might have to do recursive scan of all the objects to appropriately mark the reachable objects and build an accurate reachability graph, especially in the case where the GC is running concurrently with the mutator, as the root and reachable objects are constantly evolving.

A GC interacts with all the mutator threads to obtain a set of objects that are directly referenced by the mutator threads. In one example shown in FIG. 1A, a reachability graph is created using a root object (root node) n1 which is directly referenced by a mutator thread. Reachable objects that are referenced by the root node n1 are shown as nodes n2 and n3 and objects reachable by the reachable nodes n2 and n3 are shown as nodes n4, n5 and n6, respectively. Node n7 is reachable through node n6 and node n8 is reachable through node n7.

FIG. 1A also shows the root object n1 as being marked during the primary scan of the GC during a current cycle of garbage collection. A tri-color marking technique is utilized in this example and throughout this application. According to this marking technique, a white colored object is an unreachable object and is garbage; a gray colored object is a reachable object whose children must be examined and is not garbage; and a black colored object is a reachable object whose children have been examined and is not garbage. Other techniques to mark the objects can be used so long as the functionalities of the markings are not compromised. In the primary scan by a GC in a garbage collection cycle (GC cycle), node n1 is reachable and is marked gray, as illustrated in FIG. 1A. In the next scan by the GC, node n2 and n3 which are children nodes to root node (parent node) n1 and reachable through node n1 are grayed and the parent node n1 is blackened, as the children nodes of node n1 have already been examined, as shown in FIG. 1B. In FIG. 1C a mutator exchange occurs between nodes. Mutator exchange can occur during the execution of one or more mutator threads when a node reference of a particular node evolves and the mutator thread references a different node. According to the example illustrated in FIG. 1C, node n4 is directly reachable through root node n1 and n3 is reachable through node n2. The reachability graph is modified to reflect this change during the next step of GC cycle as shown in FIG. 1C. Nodes n7 and n8 are still reachable through n4 and are retained under node n4 as is node n6 under node n3. In the next step, nodes n5 and n6 are examined by the GC as children nodes of nodes n2 and n3, respectively, and are grayed as they are reachable through nodes n2 and n3. Nodes n2 and n3 are blackened as the children nodes n5 and n6 have been examined, as shown in FIG. 1D. The GC must notice the objects involved in the mutator exchange and examine the contents of the modified references and mark them accordingly. However, the GC does not recognize the change from the mutator exchange and, as a result, node n4 is not examined as node n1 is already blackened suggesting its children have already been examined. Consequently, the GC will skip examining node n4 during subsequent steps of the GC cycle causing node n4 to stay white and hence be recycled along with its children nodes n7 and n8. In the following step, nodes n5 and n6 are examined and blackened by the GC as there are no children nodes associated with these nodes, as shown in FIG. 1E.

In the end, even though node n4 was identified as a required object by the mutator, the marking of the nodes during the GC cycle prevented n4 and its children nodes from being identified as required objects and are recycled. To avoid such critical errors, a set of read and write barriers can be used to provide a way of identifying the modified objects so that the GC can recognize these changes and identify the modified objects, examine and mark these evolved objects prior to ending a marking phase of the GC cycle. For an efficient implementation of the GC cycle, these read/write barriers incorporated complicated logic to process the evolved objects. The complicated logic in read/write barriers have their own drawbacks. With multi-threaded applications currently implemented in most computer systems, the cost of the read/write barriers can get expensive and may lead to increase in time to execute time critical application codes making it harder to meet smaller deadlines.

In view of the foregoing, there is a need for a system and method that will overcome the aforementioned problems by implementing a garbage collection mechanism that is efficient and concurrent and is capable of meeting smaller deadlines. There is also a need for a garbage collection mechanism that is more deterministic and less intrusive.

SUMMARY

The present invention fills the need by providing a garbage collector that runs concurrently with a mutator on a computer system. The garbage collector identifies a set of objects required by an application running on the mutator and pre-marks them during a pre-marking phase so that these pre-marked objects can be retained during a garbage collection cycle. Additionally, the pre-marked objects are examined and objects that are referenced by these pre-marked objects are also pre-marked so that appropriate objects are retained in memory during garbage collection.

It should be appreciated that the present invention can be implemented in numerous ways, including as a system, process, or a method. Several inventive embodiments of the present invention are described below.

In one embodiment, a method for concurrent garbage collection and mutator execution in a computer system is provided. The method includes identifying an object required by an application running on a mutator that needs memory allocation. The identified object is pre-marked by a garbage collector as a non-recyclable object during a pre-marking phase. One or more barriers to be executed by the mutator are then activated. The barriers enable the garbage collector to complete the garbage collection cycle (GC cycle) by marking objects essential to the mutator so that unmarked objects may be safely recycled. The garbage collector (GC) is executed concurrently with the mutator so that the GC can dynamically compute a set of recyclable objects in memory at the end of a garbage collection cycle.

In another embodiment, a method for concurrent garbage collection and mutator execution in a computer system is provided. The method includes identifying a set of objects for memory allocation by a memory manager. The identified objects are required by an application running on a mutator. The identified objects are pre-marked during a pre-marking phase. The pre-marking designates the identified objects as active objects to be retained for at least a cycle of the garbage collection. A garbage collector is executed concurrently with the mutator so that the garbage collector can dynamically compute at the end of each cycle of garbage collection a set of recyclable objects in memory. The recyclable objects are identified by the absence of markings. One or more barriers to be executed by the mutator are activated upon pre-marking. The one or more barriers enable the garbage collector to finish the garbage collection cycle of marking objects so that objects not marked are guaranteed not to be useful for the mutator and can be recycled. The method further includes computing a new set of pre-marked objects before the activation of the barriers for a subsequent cycle of garbage collection.

The present invention, thus, describes system and methods for providing an efficient garbage collection that executes concurrently with a mutator on a computer system. The pre-marking of objects during the pre-marking phase allows for less intrusive computing of recyclable objects thereby allowing the processor to meet smaller deadlines. The method and system are also simple to implement, efficient, and are more deterministic.

BRIEF DESCRIPTION OF THE DRAWINGS

The invention may best be understood by reference to the following description taken in conjunction with the accompanying drawings. These drawings should not be taken to limit the invention to the preferred embodiments, but are for explanation and understanding only.

DETAILED DESCRIPTION

The present invention describes a system and method for providing an efficient and concurrent garbage collection, in a computer system. Accordingly, the present invention includes identifying an object required by an application running on a mutator. The identified object is pre-marked by a garbage collector during pre-marking phase of the object as a non-recyclable object. One or more barriers are activated upon pre-marking the objects so as to enable the garbage collector (GC) to complete a garbage collection cycle (GC cycle) by marking the objects. The GC is executed concurrently with the mutator to dynamically compute a set of recyclable objects at an end of a GC cycle. The pre-marking of the objects during a pre-marking phase greatly reduces the overhead of the barriers for the mutator thereby allowing it to meet a smaller deadline and to have a more predictable execution time. The current invention allows for a less intrusive identification of recyclable and non-recyclable objects.

Advantages of the present invention are numerous. The process recursively scans to identify reachable objects. However, the time taken by the GC to perform these operations is minimal. This is due to the fact that pre-marking of reachable objects occurs on only those essential objects that are needed by the mutator. This results in pre-marking a sub-set of objects that are in memory at any given time. Additionally, these pre-markings are performed prior to activating one or more barriers which additionally reduces the GC cycle time. Moreover, the barriers worst case execution time need not be optimized as majority of the objects are identified during the pre-marking phase. The best case, where objects are already marked, will most often be taken. This allows the worst case to be implemented with different approaches, allowing simpler and more efficient interaction with the GC when an object has to be marked by the barrier.

Several embodiments for providing an efficient and concurrent garbage collection within a processor of a computer system are described. It should be appreciated that the present invention can be implemented in different ways such as a system or a method. It will be apparent to those skilled in the art that the present invention may be practiced without some or all of the specific details set forth herein.

To facilitate an understanding of the embodiments, a high level overview of operations of a cycle of concurrent garbage collection without barrier within a computer system using pre-marking will now be described.

Figure 2:
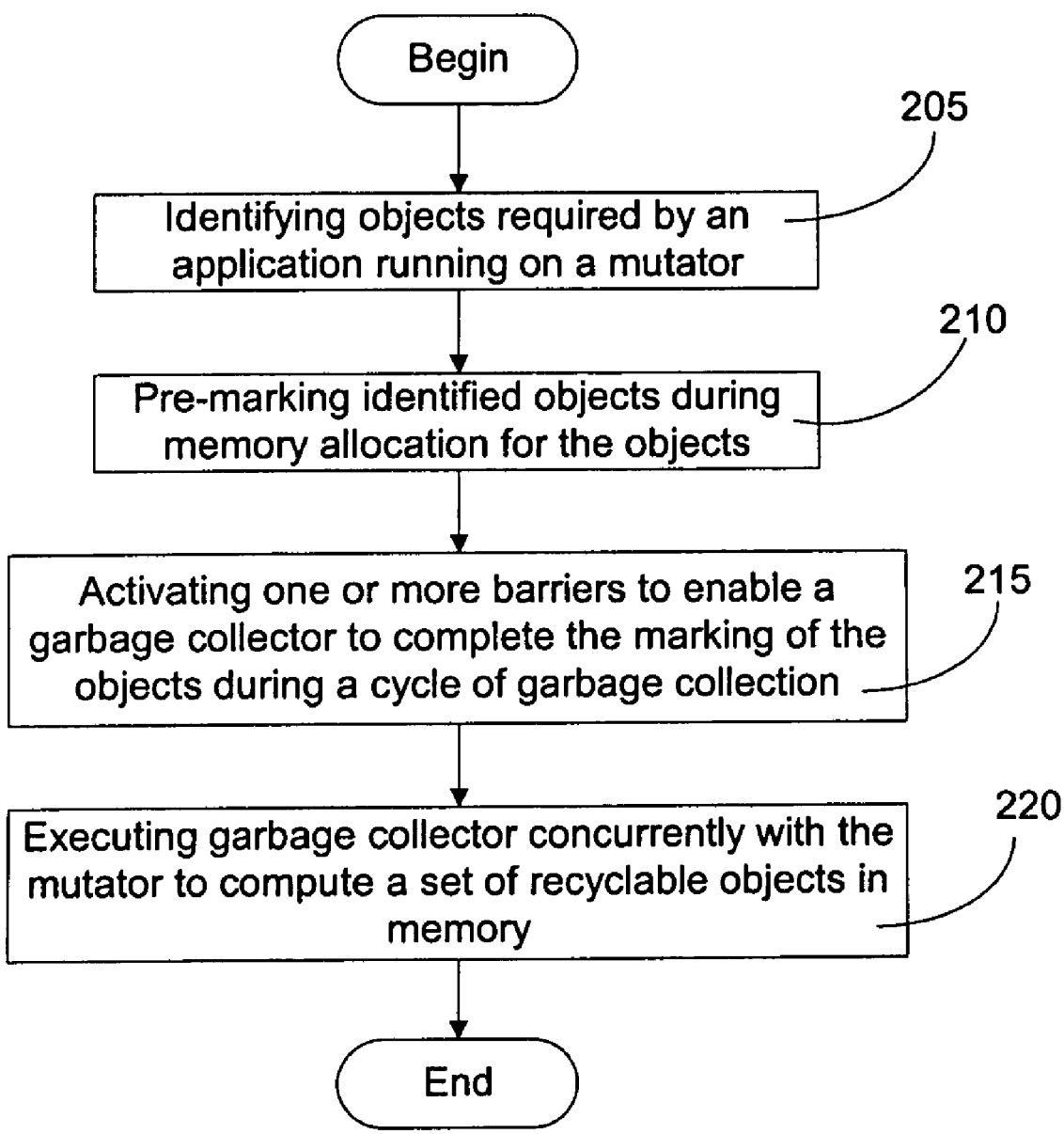
FIG. 2 illustrates a flow chart of operations for pre-marking objects during pre-marking phase, in accordance with one embodiment of the invention.

FIG. 2 illustrates a flow chart of operations for pre-marking objects during pre-marking phase, in accordance with one embodiment of the invention. FIGS. 3A through 3F illustrate the transition made by the objects during a garbage collection cycle using the pre-marking indentia.

The process begins with the operation of identifying an object that is required by a program executing on a mutator within a computer system, as illustrated in operation 205. The relevant process operations of the current invention are graphically illustrated in FIGS. 3A through 3F. These objects use non-recyclable memory within the computer system so that the executing program can reference them efficiently. As explained earlier, the executing program can run in a plurality of threads (mutator threads) with each thread actively executing a method. Each of these methods may reference one or more objects as variables. The objects that are directly referenced by a program are root objects and the objects that are referenced by these root objects or indirectly by the program threads are reachable objects.

Figure 1A:
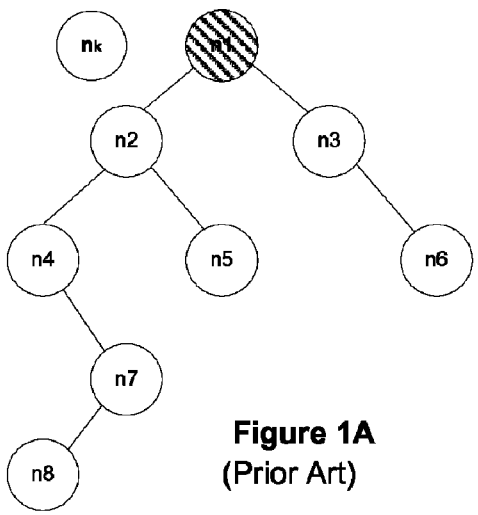
FIGS. 1A through 1E illustrate a high level overview of operations of a concurrent garbage collection cycle without barrier within a computer system.
Figure 1B:
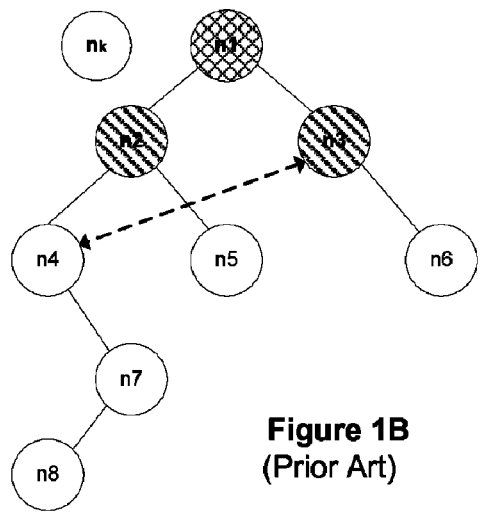
Figure 1C:
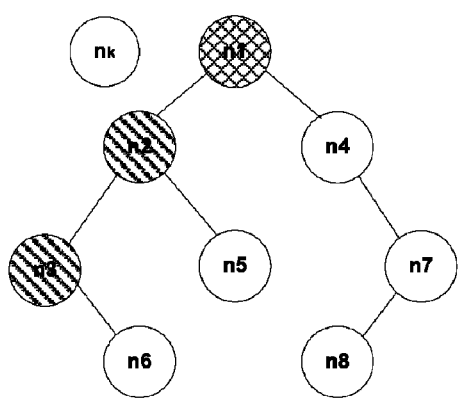
Figure 1D:
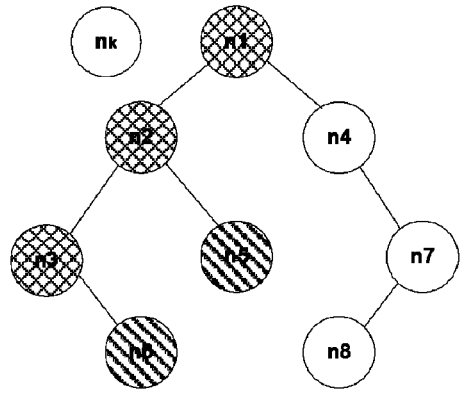
Figure 1E:
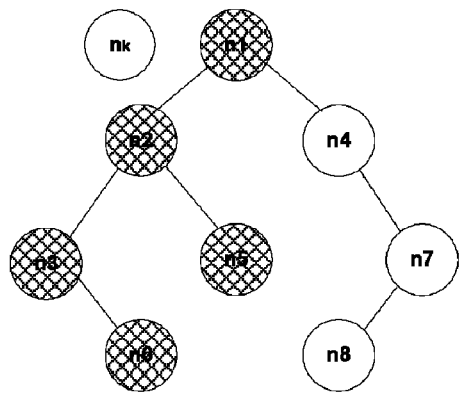
Figure 3A:
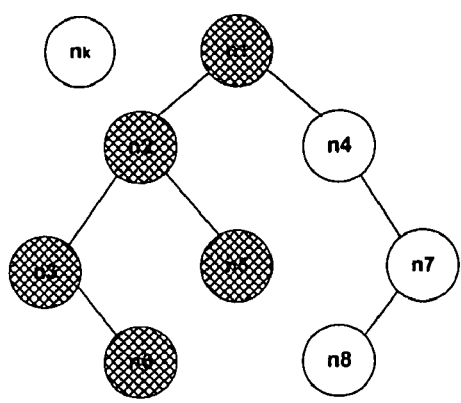
FIGS. 3A through 3F illustrate a high level overview of operations of a concurrent garbage collection cycle starting without barrier using pre-marking and then using marking with barrier, in one embodiment of the invention.

The identified objects are pre-marked using a garbage collector (GC) running concurrently with the mutator during a pre-marking phase for the identified objects, as illustrated in operation 210. The pre-marking of these objects designate these objects as non-recyclable. In order to pre-mark objects required by one or more mutator threads, in one embodiment, a reachability graph is initialized by graying a set of root objects using the garbage collector as illustrated in FIG. 1A without a read/write barrier. The objects in the reachability graph are then parsed without the read/write barriers and marked. The GC might have to recursively scan the objects in the reachability graph till all the objects are identified and marked as recyclable or non-recyclable. The resultant reachability graph is illustrated in FIGS. 1E and 3A which includes non-recyclable objects marked black and recyclable objects marked white. Thus, nodes n1, n2, n3, n5, and n6 are pre-marked upon completion of this portion of the GC cycle. As can be seen, node n4 and the nodes reachable from node n4 are not marked and, thus, the reachability graph is incomplete.

Upon the successful completion of pre-marking, one or more barriers are activated by the mutator, as illustrated in operation 215 of FIG. 2. The barriers that may be activated include but are not limited to a read barrier and a write barrier. These barriers, when executed by the mutator, enable the GC to finish the marking of objects in the current GC cycle so that objects that are not marked are no longer useful for the mutator and are guaranteed to be recycled. The pre-marking reduces the impact of the one or more barriers in terms of jitter on the mutator execution time.

Figure 3B:
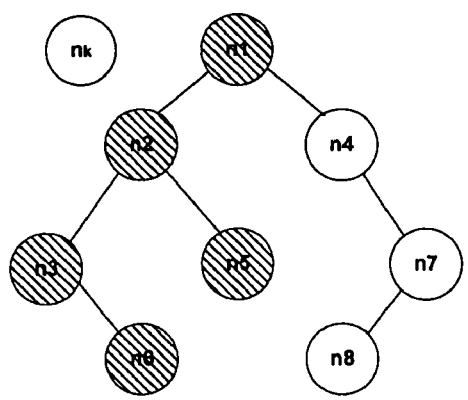
Figure 3C:
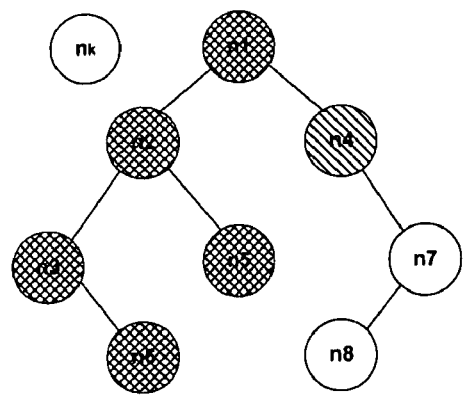
Figure 3D:
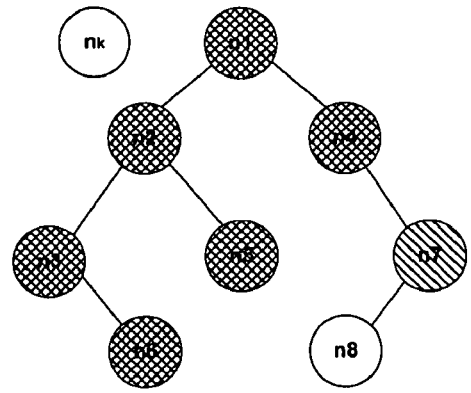
Figure 3E:
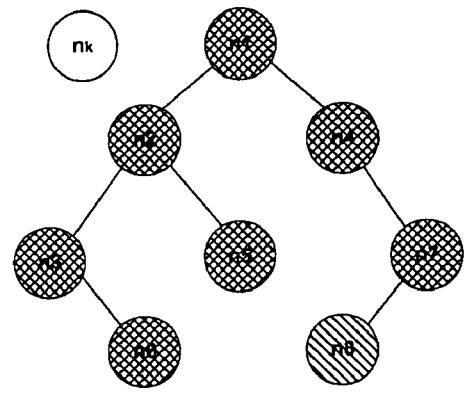
Figure 3F:
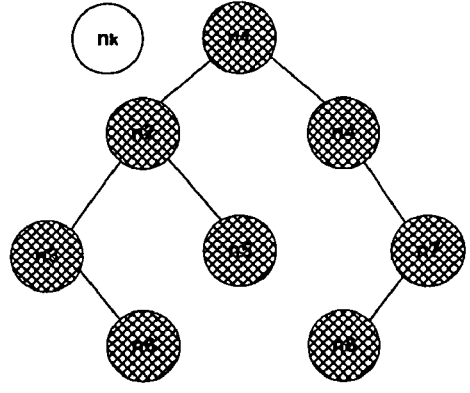

The GC is executed concurrently with the mutator so that the GC can dynamically compute objects that are recyclable and non-recyclable, as illustrated in operation 220 of FIG. 2. The objects that are reachable by the GC are non-recyclable as they are required by the mutator and the objects that are not reachable are recyclable. In order to compute the recyclable and non-recyclable objects, the GC recursively scans the reachability graph to identify all the reachable objects. Thus, the contents of root objects (including pre-marked ones) are marked gray, as illustrated in FIG. 3B. Next, these root objects are examined and the objects reachable from these root objects are marked gray, as illustrated in FIG. 3C. Thus, node n4 which is reachable from node n1 is marked gray. Further, the root objects (including pre-marked ones) are marked black (nodes n1, n2, n3, n5 and n6) as these objects required by the mutator are non-recyclable and their children nodes have already been examined. Subsequent scans from the GC recursively scan only these pre-marked and marked objects that are worth recursively scanning, such as nodes n1, n2, n3, n4, n5 and n6 of FIG. 3C, to examine the contents of these nodes for identifying reachable objects. Thus, from the subsequent scan node n7 is identified by the GC as reachable object from n4 and is marked gray. At the same time node n4 is blackened, as illustrated in FIG. 3D. In next scan, node n8 is identified as reachable from node n7 and, hence, node n8 is grayed and n7 is blackened, as illustrated in FIG. 3E. The final scan in this reachability graph results in the blackening of node n8, as illustrated in FIG. 3F. Barriers ensure that objects that could be missed because of concurrent mutator changes of the reachability graph are handled properly. Upon completing the scanning for the objects through the reachability graph, the GC now is able to compute that node nk is guaranteed as unnecessary for the mutators and can be safely recycled. The invention, thus, provides a less intrusive garbage collection by identifying the reachable objects and marking the objects that are to be recycled prior to activating the one or more expensive barriers. The current invention has been described with a simplified reachability graph as illustrated in FIGS. 3A through 3F. However, the principles of the invention can be implemented efficiently in a current multi-threaded computer environment. The current invention may also be implemented as a program on a computer readable medium.

Figure 4:
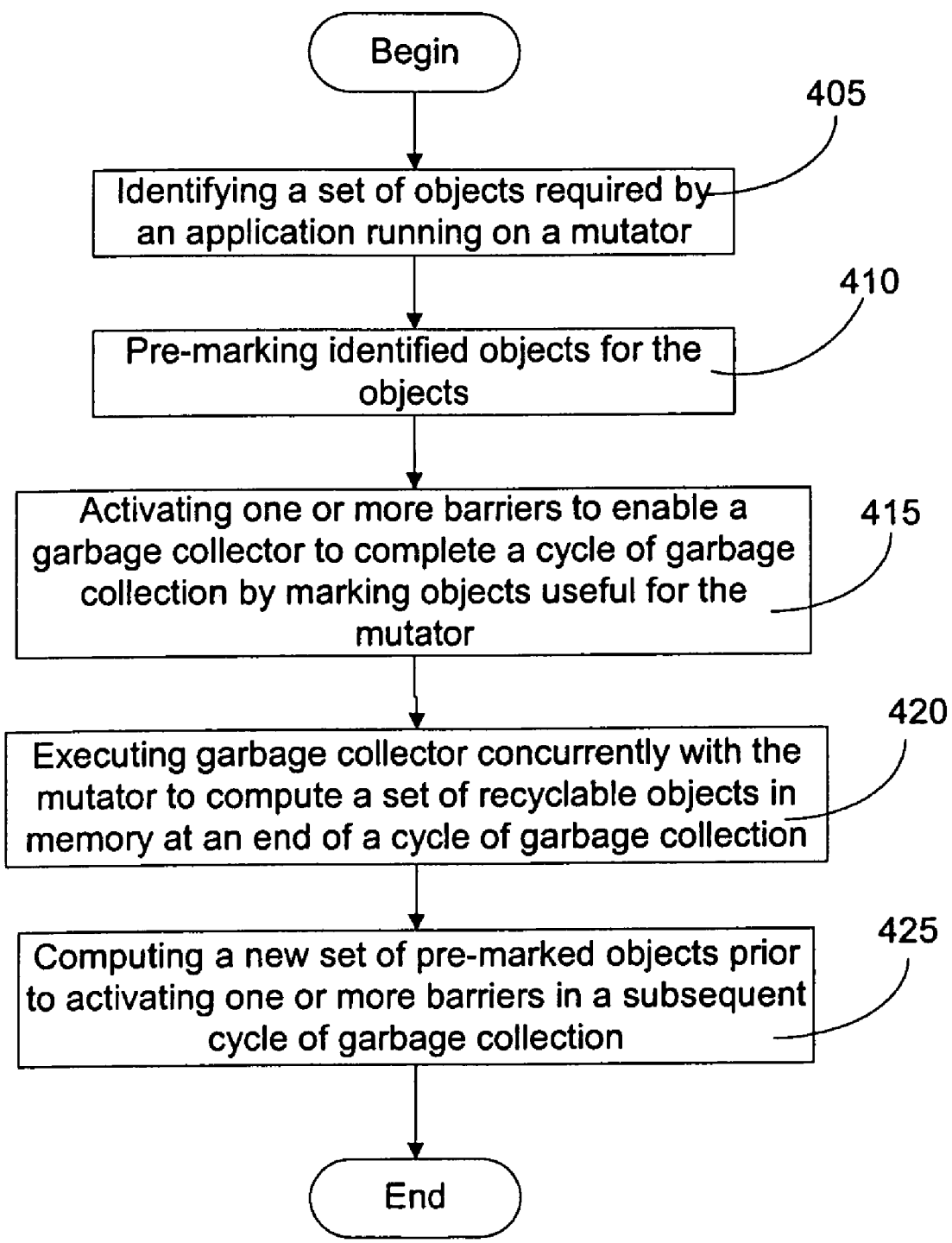
FIG. 4 illustrates an alternate flow chart of operations for pre-marking objects during pre-marking phase, in accordance with one embodiment of the invention.

A variation of the embodiment described with reference to FIG. 2 is described in FIG. 4. According to this embodiment, a method for providing an efficient and concurrent garbage collection within a computer system is provided. The method includes identifying a set of objects that are required by an application running on a mutator during pre-marking phase for these objects, as illustrated in operation 405. The identified objects are pre-marked so that these objects can be retained in memory and are not recycled for at least a current garbage collection cycle (GC cycle), as illustrated in operation 410. One or more barriers are activated by the mutator upon completion of the pre-marking of the required objects, as illustrated in operation 415. These barriers enable a garbage collector to complete a GC cycle by recursively marking the relevant objects from the pre-marked ones and the new roots found after activating the one or more barrier. The garbage collector (GC) is executed concurrently with the mutator so that the GC can compute the reachable objects and identify the objects that can be safely recycled, as illustrated in operation 420. Subsequent to the identification of all objects for the current GC cycle, the GC computes a new set of pre-marked objects for a subsequent GC cycle, as illustrated in operation 425. This identification of a new set of pre-marked objects is done prior to activating one or more barriers for the subsequent GC cycle and the GC cycle is repeated. By running the GC in a cycle, memory is managed continuously and efficiently allowing the mutator to execute faster in a more predictable amount of time.

The GC process can be further improved in numerous ways. In one embodiment of the invention, the GC cycle process can be made less intrusive with respect to critical threads by stopping one or more of the non-critical mutator threads. According to this embodiment, one or more non-critical mutator threads executing on the computer system are identified. These identified non-critical mutator threads are stopped. The pre-marking of the reachable objects are performed by the GC upon the stoppage of the non-critical mutator threads. As lesser evolution of the required objects occur at this time due to less mutator threads running, less objects will be missed by the pre-marking, reducing further the chances of detecting an unreachable object. One or more barriers are activated and a GC is executed concurrently with the remaining mutator threads to enable identifying objects that are to recycled at the end of a GC cycle.

In another embodiment, the GC is completed faster by aborting the pre-marking phase. In this embodiment, the pre-marking phase that recursively scans all the objects during pre-marking phase prior to activating one or more barriers is aborted. Upon aborting the pre-marking phase, one or more barriers are activated and the GC is executed concurrently with the mutator so that the GC cycle can be completed faster. This might be necessary if the free memory is nearly exhausted.

It is noted herein that the objects that maintain their pre-mark at least through a current GC cycle are those that were recently identified as reachable. Additionally, some of the objects may survive one or more GC cycle. These objects are considered old objects and they maintain the pre-mark at the end of a GC cycle based on the number of GC cycles they survive, so that these objects can survive the next GC cycle. Some objects retain their pre-mark through the execution of the program based on their memory location. Some examples of location based objects that never get recycled are those that are declared as constants or ImmortalMemory for Real-time Specification for Java. Although objects in a Java environment have been used in the above example of memory locations, objects identified as constants from other distributed environments can be used. By identifying more pre-marked objects in a GC cycle, the pre-marking time is greatly reduced thereby decreasing the chance of missing one or more critical objects. This allows for faster and less intrusive marking of reachable and unreachable objects.

The invention may be practiced with other computer system configurations including hand-held devices, microprocessor systems, microprocessor-based or programmable consumer electronics, minicomputers, mainframe computers and the like. The invention may also be practiced in distributed computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

It will be obvious, however, to one skilled in the art, that the present invention may be practiced without some or all of these specific details. In other instances, well known process operations have not been described in detail in order not to unnecessarily obscure the present invention.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for providing concurrent garbage collection, in a computer system, comprising:

identifying a set of objects for memory allocation by a memory manager, the identified objects required by an application running on a mutator;

pre-marking the identified objects during a pre-marking phase using a reachability graph, the pre-marking designating the identified objects as active objects to be retained for at least a current cycle of the garbage collection;

executing a garbage collector concurrently with the mutator to dynamically compute a set of recyclable objects in memory at the end of each cycle of garbage collection, the recyclable objects identified by the absence of markings;

activating one or more barriers by the mutator after pre-marking the identified objects, the one or more barriers allowing the garbage collector to recursively scan objects in the reachability graph including the pre-marked objects and to finish the current cycle of garbage collection by marking objects and guarantying that objects not marked are no longer useful for the mutator and can be recycled;

completing the current cycle of garbage collection, wherein the objects that are not marked are recycled and wherein the one or more barriers that were activated by the mutator are deactivated; and computing a new set of pre-marked objects before the activation of the barriers for a subsequent cycle of garbage collection.

2. The method of claim 1, wherein the mutator runs the application in a plurality of mutator threads.

3. The method of claim 2, wherein the pre-marking further comprising:
identifying one or more non-critical mutator threads from the plurality of mutator threads executing on the computer system;
stopping the identified non-critical mutator threads; and
pre-marking one or more of the objects that are reachable by one or more of the plurality of mutator threads.

4. The method of claim 1, wherein one or part of all of the pre-marked objects are root objects.

5. The method of claim 1, wherein one or more objects reachable from the pre-marked objects during a recursive pre-marking are pre-marked, the objects that are recursively pre-marked are those reachable only from objects that are pre-marked and marked for recursively scanning.

6. The method of claim 5, wherein pre-marking is aborted before the end of the recursive pre-marking to activate the one or more barriers earlier and complete the garbage collection cycle faster.

7. The method of claim 1, wherein the garbage collector maintains pre-marking on one or more objects, the objects maintaining pre-marking are any one or more of: a) non-recyclable objects at the end of the current cycle of garbage collection; b) objects allocated during the current cycle of garbage collection; c) objects that have survived a given number of cycles of garbage collection; d) objects that are never to be recycled; and e) objects used by critical threads executing on the computer system.

8. The method of claim 1, wherein the method is incorporated as a program in a computer readable medium, the computer readable medium configured to execute the program on a computer system.

9. The method of claim 1, wherein the garbage collector performs the pre-marking at a priority lower than a plurality of time critical mutator threads.

10. The method of claim 1, wherein the pre-marking uses a tri-color technique to mark the objects.

11. The method of claim 1, wherein the barrier is anyone of a read-barrier or a write barrier.

* * * * *